UNITED STATES PATENT OFFICE 2,578,301

1,1,2,5-TETRACHLOROTHIOPHANE

Robert L. Haynor, El Cerrito, Calif., assignor to California Research Corporation, San Francisco, Calif., a corporation of Delaware No Drawing. Application September 29, 1950
Serial No. 187,694

3 Claims. (Cl. 260—332.5)

This invention relates to a new compound produced by the reaction of thiophane (tetrahydrothiophene) and sulfuryl chloride.

I have found that by reacting thiophane with sulfuryl chloride in the cold under an inert atmosphere, a heretofore unknown chemical compound which may be designated as $\alpha,\alpha'$-dichlorothiophane dichloride is produced in good yields in accordance with the following equation:

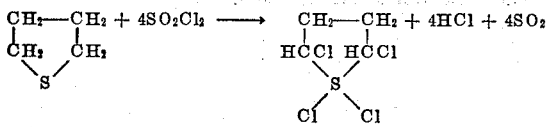

The application of sulfuryl chloride for the reaction with thiophane achieves a better control of the rate of chlorination than could be obtained by employing chlorine gas for the same purpose.

The conditions required for the successful production of this new compound of my invention comprise maintaining the temperature of reaction near the temperature of ice (0° C.) or below such temperature, carrying out the reaction under an inert atmosphere in substantial absence of moisture and, finally, employing not more than 4 mols of sulfuryl chloride for each mol of thiophane. High yields of $\alpha,\alpha'$-dichlorothiophane dichloride are secured by employing an excess of thiophane, particularly if the reaction is conducted in the presence of a non-reactive diluent, for instance, chloroform, carbon tetrachloride, or the like.

The reaction ordinarily occupies from about 1½ to 3 hours. Side-reactions which otherwise adversely affect the yield of my new product are reduced by operating in the neighborhood of 0° C. and by the employment of an inert atmosphere, e. g., nitrogen, carbon dioxide, or the like.

The procedure for preparing $\alpha,\alpha'$-dichlorothiophane dichloride is quite simple: Sulfuryl chloride is fed into a chilled reaction vessel provided with a stirrer and containing thiophane alone or thiophane diluted with a non-reactive solvent. As the chlorination proceeds, HCl and $SO_2$ gases are released and completion of the reaction is indicated when the evolution of HCl and $SO_2$ from the vessel essentially ceases. The reaction product mixture containing crystals of $\alpha,\alpha'$-dichlorothiophane dichloride is combined with a hydrocarbon solvent for the crystalline material, e. g., with normal hexane, and heated to about 55° C. to dissolve the crystals in the hydrocarbon. The $\alpha,\alpha'$-dichlorothiophane dichloride recrystallizes from the solution upon standing overnight at a temperature of 0 to 5° C. Any excess thiophane may be removed from the mother liquor by distillation at reduced pressure if so desired.

The following two examples illustrate the procedure to be followed for the successful production of $\alpha,\alpha'$-dichlorothiophane dichloride.

Example 1

0.85 mols of thiophane is charged into a glass flask under an atmosphere of nitrogen, and 3.7 mols of sulfuryl chloride is fed into the flask which is maintained at a temperature of about 0 to 5° C. while stirring continuously. After about 1 hour and 15 minutes, sufficient hexane is added to the reaction product mixture and the resulting mixture is heated to about 55–60° C. to completely dissolve the $\alpha,\alpha'$-dichlorothiophane dichloride product, which is then recovered upon being chilled overnight in the form of white crystals in a 40% yield based on the thiophane (one single recrystallization).

Example 2

1 mol of thiophane is charged into a glass flask under an atmosphere of nitrogen and 3.1 mols of sulfuryl chloride is fed into the flask under the same conditions as indicated in the preceding example. However, in this case sulfuryl chloride is fed over a period of 5.5 hours. 0.42 mol of $\alpha,\alpha'$-dichlorothiophane dichloride corresponding to a yield of 42% based on the thiophane is recovered from the reaction product after cooling overnight. The white crystals obtained in accordance with my invention have a melting point of 173 to 174° C. The product $\alpha,\alpha'$-dichlorothiophane dichloride is unstable if left exposed to the air, and has a tendency to hydrolyze forming the sulfoxide. Therefore, it should be stored under a dry, inert atmosphere or in solution in a suitable anhydrous solvent, e. g., a petroleum hydrocarbon thinner.

The equivalent weight value of 56.5 determined by saponification with alcoholic KOH agreed with the theoretical figure of 57 and indicated the presence of 4 chlorine atoms in the reaction product. The electrometric titration of the product in aqueous alcohol for the two chlorines attached to sulfur gave an equivalent weight value of 113.6, which agreed with the calculated figure of 114 corresponding to the molecular weight of 228 of $\alpha,\alpha'$-dichlorothiophane dichloride.

The reaction product was also analyzed for chlorine and sulfur. The values obtained were: Cl—62.84; S—14.13. These values are in agreement with the corresponding calculated values of 62.2 and 14.08.

The $\alpha,\alpha'$-dichlorothiophane dichloride product of my invention represents a valuable chemical intermediate and may be employed for the production of insecticidal and fungicidal compounds, as well as for the manufacture of quaternary germicides by reacting the dichloride with tertiary amines.

I claim:

1. As a new compound 1,1,2,5-tetrachlorothiophane having the formula

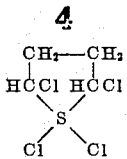

2. A method for producing 1,1,2,5-tetrachlorothiophane having the formula

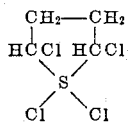

which comprises reacting thiophane with sulfuryl chloride in the mol ratio of sulfuryl chloride to thiophane not greater than 4:1 at a temperature not higher than about 0° C. in a substantial absence of moisture.

3. A method for producing 1,1,2,5-tetrachlorothiophane having the formula

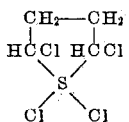

which comprises reacting thiophane with sulfuryl chloride in a mol ratio of sulfuryl chloride to thiophane not greater than 4:1 at a temperature not higher than 0° C. in a substantial absence of moisture, separating the 1,1,2,5-tetrachlorothiophane product from the reaction product mixture by the addition of a hydrocarbon solvent, and recovering the crystalline 1,1,2,5-tetrachlorothiophane from its solution in the hydrocarbon solvent by recrystallization.

ROBERT L. HAYNOR.

REFERENCES CITED

The following references are of record in the file of this patent:

UNITED STATES PATENTS

| Number | Name | Date |
|---|---|---|
| 2,540,675 | Johnson | Feb. 6, 1951 |

OTHER REFERENCES

Gilman, "Organic Chemistry," ed. 2, vol. 1, page 858, Wiley, N. Y., 1943.